US012583035B2

(12) United States Patent
Suzuki et al.

(10) Patent No.: US 12,583,035 B2
(45) Date of Patent: Mar. 24, 2026

(54) COMBINED PROCESSING MACHINE

(71) Applicant: FUJI CORPORATION, Chiryu (JP)

(72) Inventors: Toshifumi Suzuki, Toyota (JP); Kenji Mizuta, Kasugai (JP)

(73) Assignee: FUJI CORPORATION, Chiryu (JP)

( * ) Notice: Subject to any disclaimer, the term of this patent is extended or adjusted under 35 U.S.C. 154(b) by 534 days.

(21) Appl. No.: 18/041,906

(22) PCT Filed: Oct. 28, 2020

(86) PCT No.: PCT/JP2020/040496
§ 371 (c)(1),
(2) Date: Feb. 16, 2023

(87) PCT Pub. No.: WO2022/091266
PCT Pub. Date: May 5, 2022

(65) Prior Publication Data
US 2023/0321731 A1      Oct. 12, 2023

(51) Int. Cl.
*B23B 3/30* (2006.01)
*B23Q 11/08* (2006.01)

(52) U.S. Cl.
CPC ................ *B23B 3/30* (2013.01); *B23Q 11/08* (2013.01)

(58) Field of Classification Search
CPC ........... B23B 3/30; B23B 29/323; B23B 3/32; B23Q 11/08; B23Q 11/0891;
(Continued)

(56) References Cited

U.S. PATENT DOCUMENTS 5,439,431 A * 8/1995 Hessbruggen ......... B23Q 11/08
29/DIG. 56
6,626,075 B2 * 9/2003 Hirose ................. B23Q 39/026
82/121
(Continued)

FOREIGN PATENT DOCUMENTS

JP          2-279202 A      11/1990
JP          4-19036 A      1/1992
(Continued)

OTHER PUBLICATIONS

International Search Report issued Jan. 12, 2021 in PCT/JP2020/040496 filed on Oct. 28, 2020, 3 pages.

*Primary Examiner* — Lawrence Averick
(74) *Attorney, Agent, or Firm* — Oblon, McClelland, Maier & Neustadt, L.L.P.

(57) ABSTRACT

There is provided a combined processing machine including: a first workpiece main spindle device and a second workpiece main spindle device including a main spindle stand configured to rotatably hold a main spindle about an axis; a first turret device and a second turret device including a turret configured to attach multiple turret tools disposed above the first workpiece main spindle device and the second workpiece main spindle device; a tool main spindle device disposed between the first turret device and the second turret device and including a main spindle head configured to exchangeably and rotatably hold a main spindle head tool; and two separation shutters configured to partition between the first turret device and the second turret device, on both sides of the tool main spindle device in a width direction.

4 Claims, 10 Drawing Sheets

(58) Field of Classification Search
CPC ................ B23Q 39/027; B23Q 39/048; B23Q
2039/004; B23Q 2039/008; B23Q
2230/006; B23P 23/02
See application file for complete search history.

(56) References Cited

U.S. PATENT DOCUMENTS

| | | | | |
|---|---|---|---|---|
| 7,743,689 | B2 * | 6/2010 | Grossmann | .......... B23Q 39/048 |
| | | | | 82/121 |
| 8,814,769 | B2 * | 8/2014 | Fujioka | .............. B23Q 3/15573 |
| | | | | 483/26 |
| 9,233,445 | B2 * | 1/2016 | Boehringer | ............. B23B 25/04 |
| 2002/0014139 | A1 * | 2/2002 | Hirose | .................... B23B 3/168 |
| | | | | 82/121 |
| 2009/0136312 | A1 * | 5/2009 | Grossmann | .......... B23Q 39/048 |
| | | | | 29/27 C |
| 2014/0079500 | A1 * | 3/2014 | Boehringer | ........... B23Q 7/046 |
| | | | | 409/134 |
| 2014/0251097 | A1 * | 9/2014 | Walz | ........................ B23B 3/168 |
| | | | | 82/121 |
| 2023/0286057 | A1 * | 9/2023 | Mizuta | .................... B23B 11/00 |

FOREIGN PATENT DOCUMENTS

| | | | |
|---|---|---|---|
| JP | 6-134603 | A | 5/1994 |
| JP | 2003-231035 | A | 8/2003 |
| JP | 2005-254428 | A | 9/2005 |
| WO | WO 01/30522 | A1 | 5/2001 |

* cited by examiner

COMBINED PROCESSING MACHINE

TECHNICAL FIELD

The present disclosure relates to a combined processing machine including a separation shutter for dividing a cavity for multiple works performed by multiple devices.

BACKGROUND ART

Patent Literature 1 discloses a combined NC lathe (combined working machine) capable of performing working such as a machining center. This combined working machine is an opposed biaxial lathe having a tool spindle capable of exchanging a tool and a tool turret including multiple exchanging tools, and is for efficiently working workpieces in various shapes, from materials to finished products, on the same machine. Specifically, a left side main spindle and a right side main spindle facing each other on the same axis line are included, a left side turret and a right side turret are disposed on front lower sides of both main spindles, and further, a third tool rest is provided on a back upper side of both main spindles. The combined working machine of the conventional example is provided with a tool magazine for accommodating multiple tools to be used for the third tool rest, and an automatic tool exchanger for exchanging the tools in the tool rests.

PATENT LITERATURE

Patent Literature 1: International Publication No. WO2001/030522

BRIEF SUMMARY

Technical Problem

In a conventional combined processing machine, a workpiece is gripped by each of a left side main spindle and a right side main spindle facing each other, and processing by each device of a left side turret and a right side turret is performed on the workpiece. At a time of workpiece processing, coolant is sprayed on a workpiece processing section, so that shavings, chips, and the like are scattered. Accordingly, the shavings and the like generated by workpiece processing of one of left and right performed in a processing chamber adhere to, for example, the other turret or a tool of a third tool rest which is standing by. The shavings and the like adhering in this manner reduce processing accuracy of the workpiece.

In order to solve the above-described problems, an object of the present disclosure is to provide a combined processing machine including a separation shutter for dividing a work cavity.

Solution to Problem

According to one aspect of the present disclosure, there is provided a combined processing machine including: a first workpiece main spindle device and a second workpiece main spindle device including a main spindle stand configured to rotatably hold a main spindle about an axis; a first turret device and a second turret device including a turret configured to attach multiple turret tools disposed above the first workpiece main spindle device and the second workpiece main spindle device; a tool main spindle device disposed between the first turret device and the second turret device and including a main spindle head configured to exchangeably and rotatably hold a main spindle head tool; and two separation shutters configured to partition between the first turret device and the second turret device, on both sides of the tool main spindle device in a width direction.

Advantageous Effects

With the configuration described above, since the tool main spindle device is disposed between the first workpiece main spindle device and the first turret device, and the second workpiece main spindle device and the second turret device, and two separation shutters are provided so as to partition each, each work can be performed without being affected by workpiece processing or the like performed in another partitioned cavity.

DESCRIPTION OF EMBODIMENTS

Figure 1:
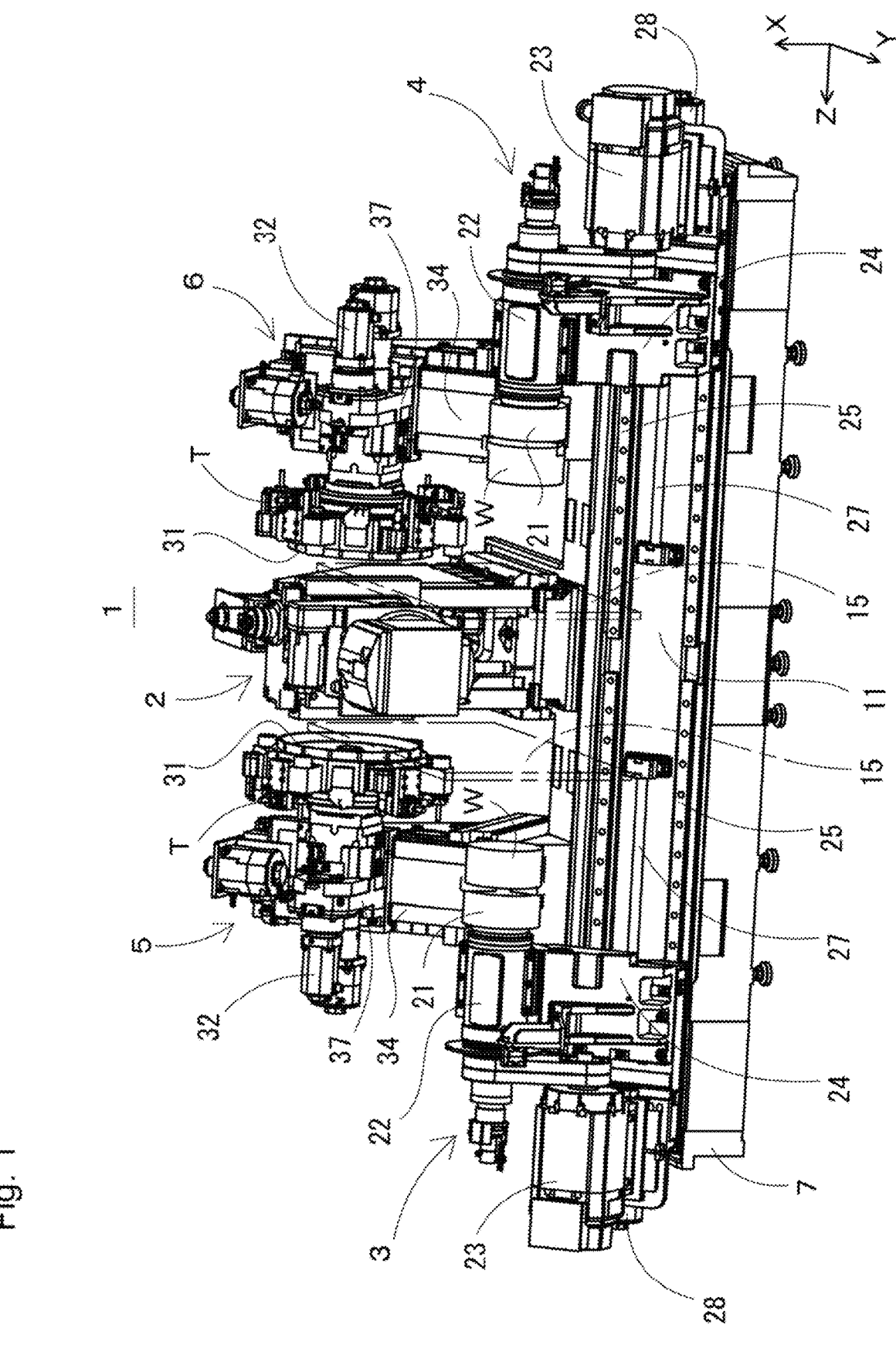
FIG. 1 is a perspective view illustrating a main structure of a combined working machine.
Figure 2:
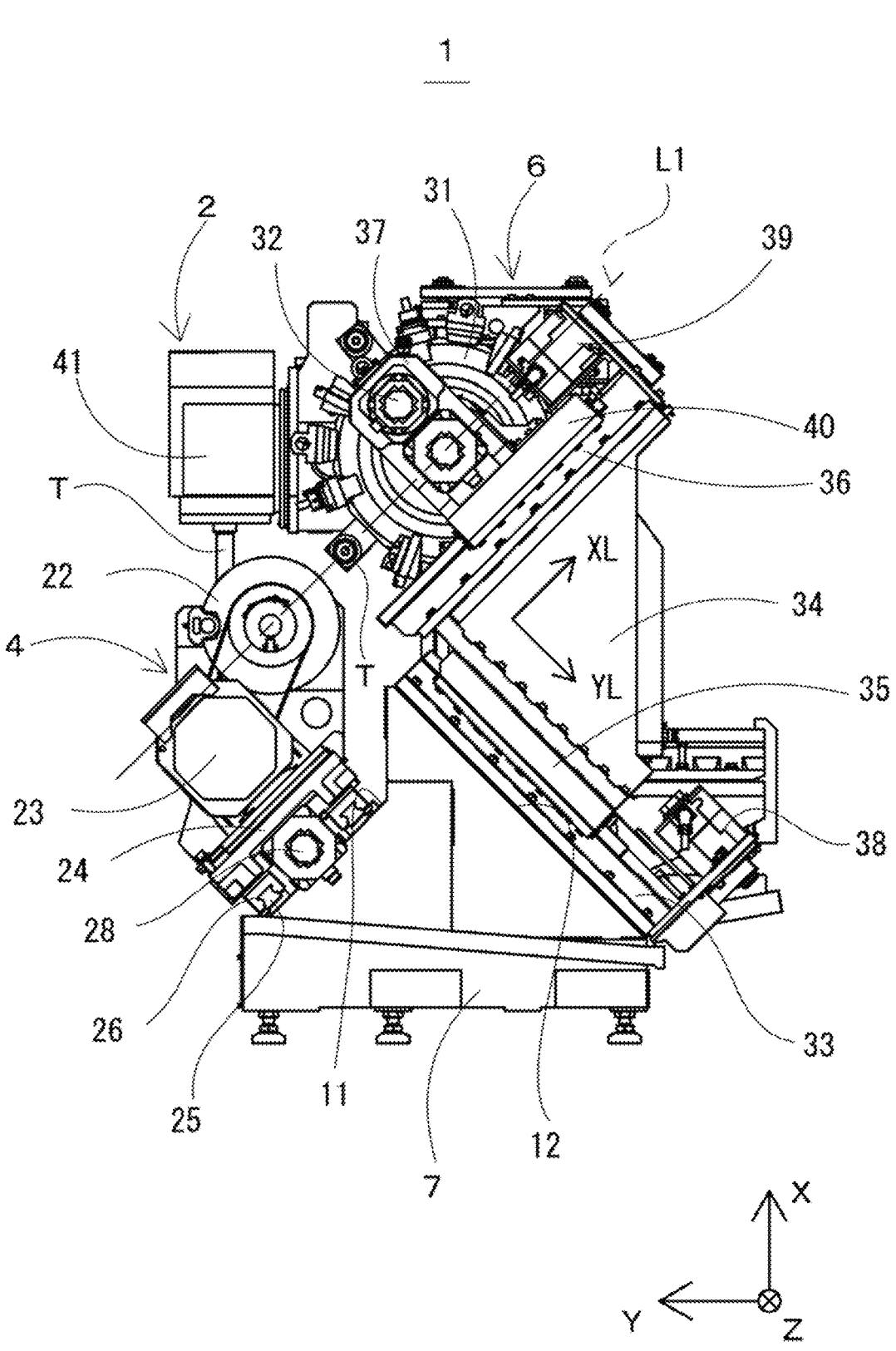
FIG. 2 is a side view illustrating the main structure of the combined working machine.

An embodiment of a combined working machine according to the present disclosure will be described below with reference to the drawings. The combined working machine according to the present embodiment is a machine tool having both functions of an NC lathe and a machining center in the same manner as the conventional example. FIGS. 1 and 2 are a perspective view and a side view illustrating a main structure of the combined processing machine according to the present embodiment. In combined processing machine 1, in addition to an opposed biaxial lathe in which first workpiece main spindle device 3 and second workpiece main spindle device 4 that impart rotation to gripped workpiece W, and first turret device 5 and second turret device 6 having multiple tools T corresponding to processing on workpiece W are respectively disposed symmetrically with respect to a left-right direction, tool main spindle device 2 for executing processing difficult in the lathe is provided at a machine body center.

First and second workpiece main spindle devices 3 and 4 (hereinafter, referred to as workpiece main spindle devices 3 and 4 in a case where both devices are commonly described) have the same structure, a spindle is rotatably incorporated in cylindrical main spindle stand 22, and chuck mechanism 21 for gripping and releasing workpiece W as a working target is assembled to main spindle stand 22. A belt is bridged over the spindle via a pulley with a rotation axis of spindle motor 23, so that phase determination at a time of working or rotation at a predetermined speed with respect to workpiece W gripped by chuck mechanism 21 is imparted.

Workpiece main spindle devices 3 and 4 are configured such that main spindle stand 22 or spindle motor 23 is mounted on main spindle slide 24 and front inclined surface 11 of bed 7 is moved in a Z-axis direction. Although a center line of a main spindle is designed to be in a machine body width direction and horizontal, in the present embodiment, the Z-axis direction means a direction parallel to the center line. Two guide rails 25 parallel to the Z-axis are fixed to front inclined surface 11 of bed 7, and guide block 26 fixed to a lower surface of main spindle slide 24 slidably meshes with guide rail 25. Main spindle stand 22 and spindle motor 23 mounted on main spindle slide 24 are disposed on the up-down side so as not to project greatly from front inclined surface 11 toward a front side.

Workpiece main spindle devices 3 and 4 can be moved in the Z-axis direction by a ball screw mechanism, and screw shaft 27 parallel to the Z-axis is supported between two guide rails 25 via a bearing. Z-axis servo motor 28 is provided on the outside in the machine body width direction, and a rotation axis of Z-axis servo motor 28 is connected to screw shaft 27. On the other hand, a nut member through which screw shaft 27 passes is fixed to main spindle slide 24, so that main spindle slide 24 is configured to linearly move in the Z-axis direction by the rotational output of Z-axis servo motor 28.

Next, first turret device 5 and second turret device 6 (hereinafter, turret devices 5 and 6 in a case where both devices are commonly described) select corresponding tool T from multiple tools T (turret tools) by revolving indexing, and perform predetermined processing such as cutting on workpiece W. Turret devices 5 and 6 are configured such that multiple tools T are attached to disk-shaped turret 31 at equal intervals in a circumferential direction, and arbitrary tool T can be positioned at a working position on the circumference by rotational control of indexing servomotor 32. Tool T of turret 31 is attached such that a tip end of a bite, a drill, or the like faces an outside in the machine body width direction. Accordingly, at a time of working, workpiece main spindle devices 3 and 4 are moved in the Z-axis direction, so that tool T abuts onto facing workpiece W from the machine body center side.

In order to move tool T to the processing position, turret devices 5 and 6 are configured such that turret 31 is moved on an XY-plane orthogonal to the Z-axis, in the YL-axis direction and the XL-axis direction having an angle of 45 degrees with respect to the horizontal direction and the vertical direction. Rear inclined surface 12 parallel to the YL-axis is formed on bed 7, and YL-axis guide rail 33 is fixed thereto. Base slide 34 in a substantially triangular shape is provided with guide section 35 on one side thereof for sliding YL-axis guide rail 33, and an adjacent side at 90 degrees is a mounting surface of turret 31, on which XL-axis guide rail 36 is provided. Guide section 40 of turret slide 37 slidably meshes with XL-axis guide rail 36.

A ball screw mechanism is provided on base slide 34 and turret slide 37. A screw shaft parallel to each of YL-axis guide rail 33 and XL-axis guide rail 36 is supported by a bearing, and the screw shaft passes through a nut member fixed to base slide 34 or turret slide 37. Each screw shaft is connected to a rotation axis of YL-axis servo motor 38 or XL-axis servo motor 39. Accordingly, turret devices 5 and 6 can perform not only the movement control in each direction of the YL-axis and the XL-axis of turret 31 by the drive control of YL-axis servo motor 38 and XL-axis servo motor 39, but also the movement control in the horizontal direction in which the movements in both axial directions are combined.

Figure 3:
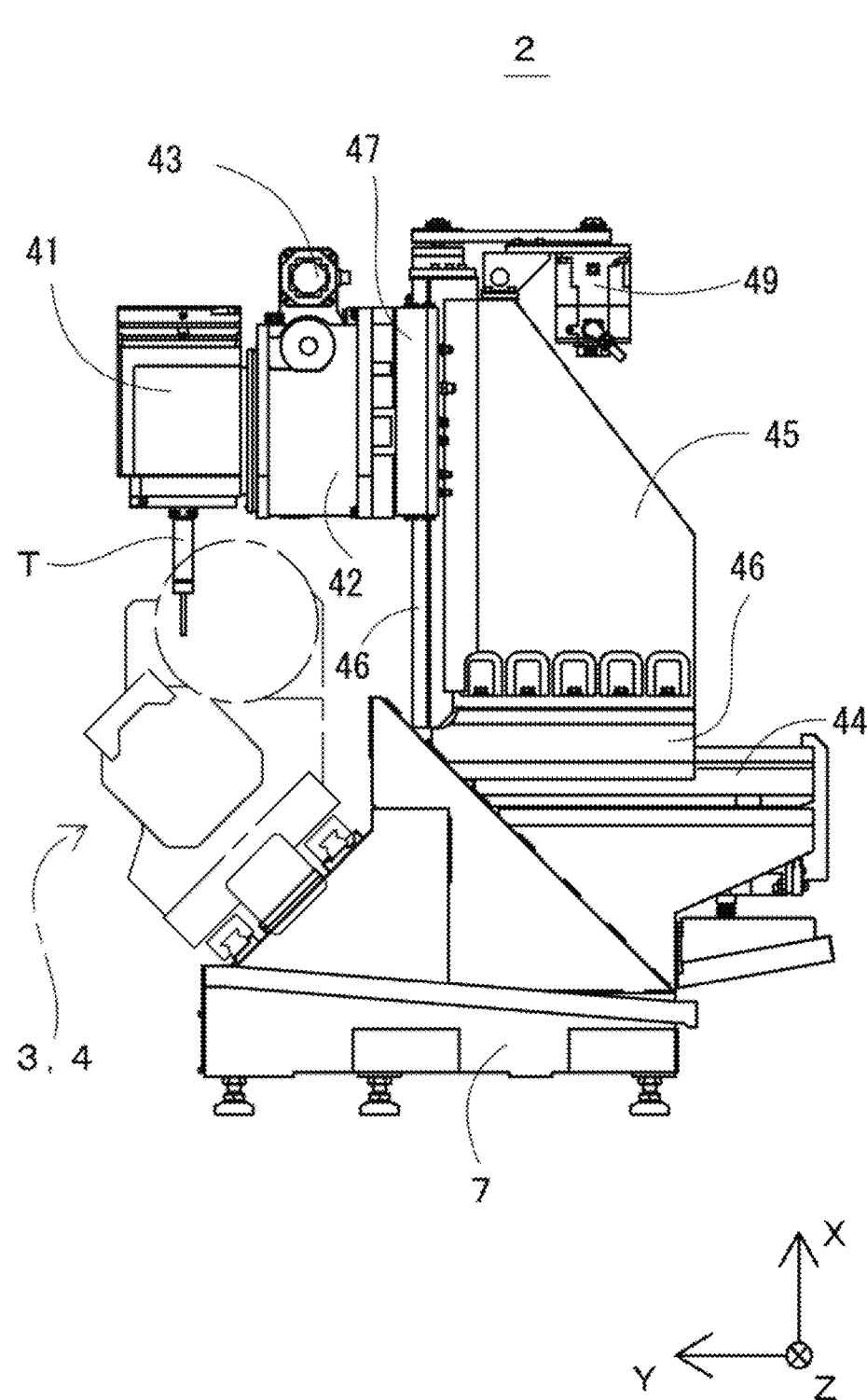
FIG. 3 is a side view illustrating a tool main spindle device.

Next, FIG. 3 is a side view illustrating tool main spindle device 2. In tool main spindle device 2, a servomotor for a main spindle and a tool spindle are built in main spindle head 41, and various tools T (main spindle head tools) housed in automatic tool exchanger 8 (refer to FIG. 5) are replaced with a tool attachment portion provided at a lower end portion of main spindle head 41. Main spindle head 41 is configured to be rotatably attached to main spindle slide 42, and transmit the rotation of B-axis motor 43 via a rotation transmission mechanism.

In order to move tool T to the processing position, tool main spindle device 2 is configured such that main spindle head 41 is moved in a horizontal Y-axis direction and a vertical X-axis direction. Horizontal guide rail 44 is fixed on bed 7, and guide section 46 of base slide 45 slidably meshes with guide rail 44. Base slide 45 is configured with vertical rail portion 46 on a front side, and guide section 47 of main spindle slide 42 slidably meshes with rail portion 46. Both base slide 45 and main spindle slide 42 are provided with a ball screw mechanism. Y-axis servo motor 48 (refer to FIG. 3) or X-axis servo motor 49 is connected by passing a screw shaft in each direction through a nut member fixed to base slide 45 or main spindle slide 42.

Figure 4:
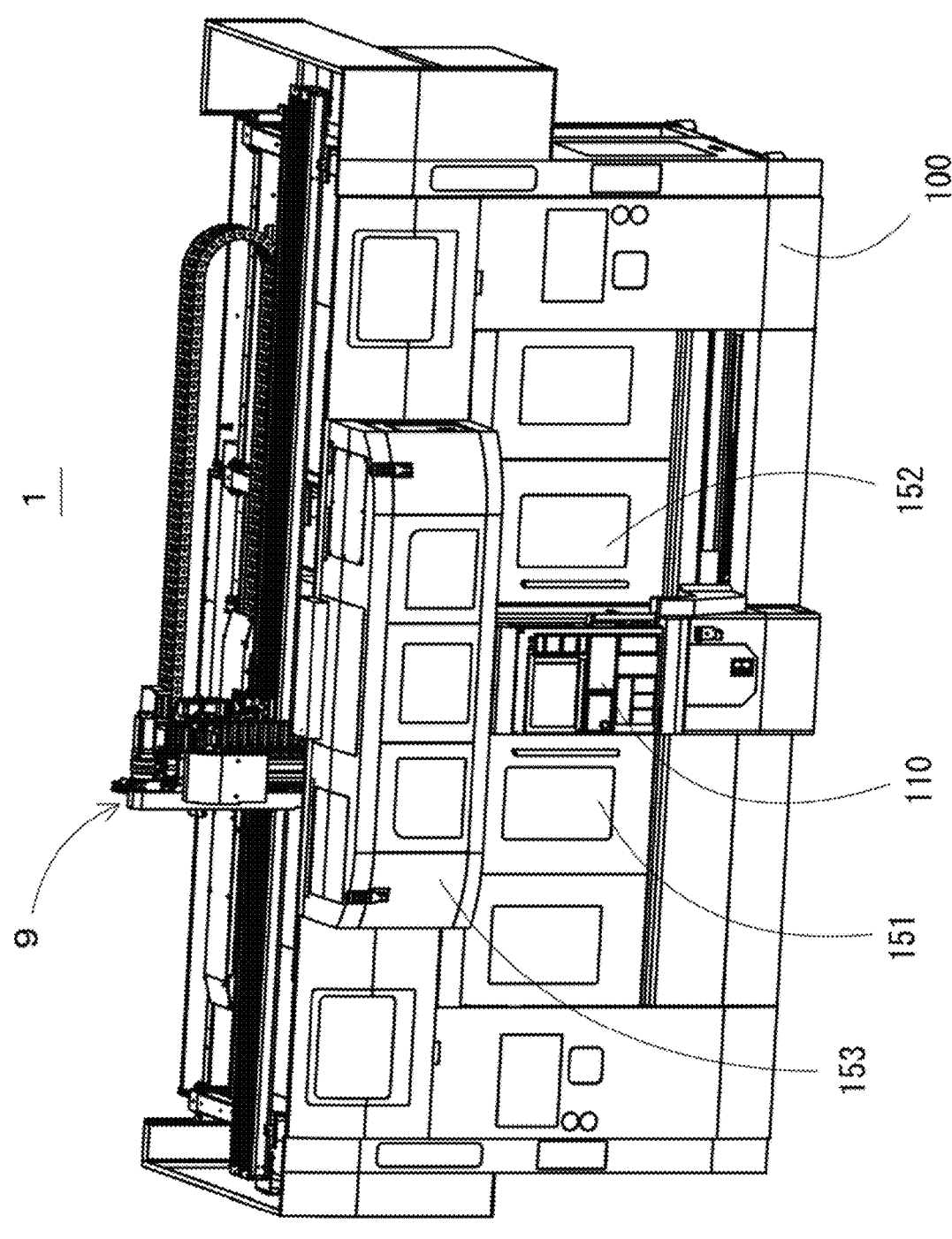
FIG. 4 is an appearance perspective view of the entire combined processing machine.
Figure 8:
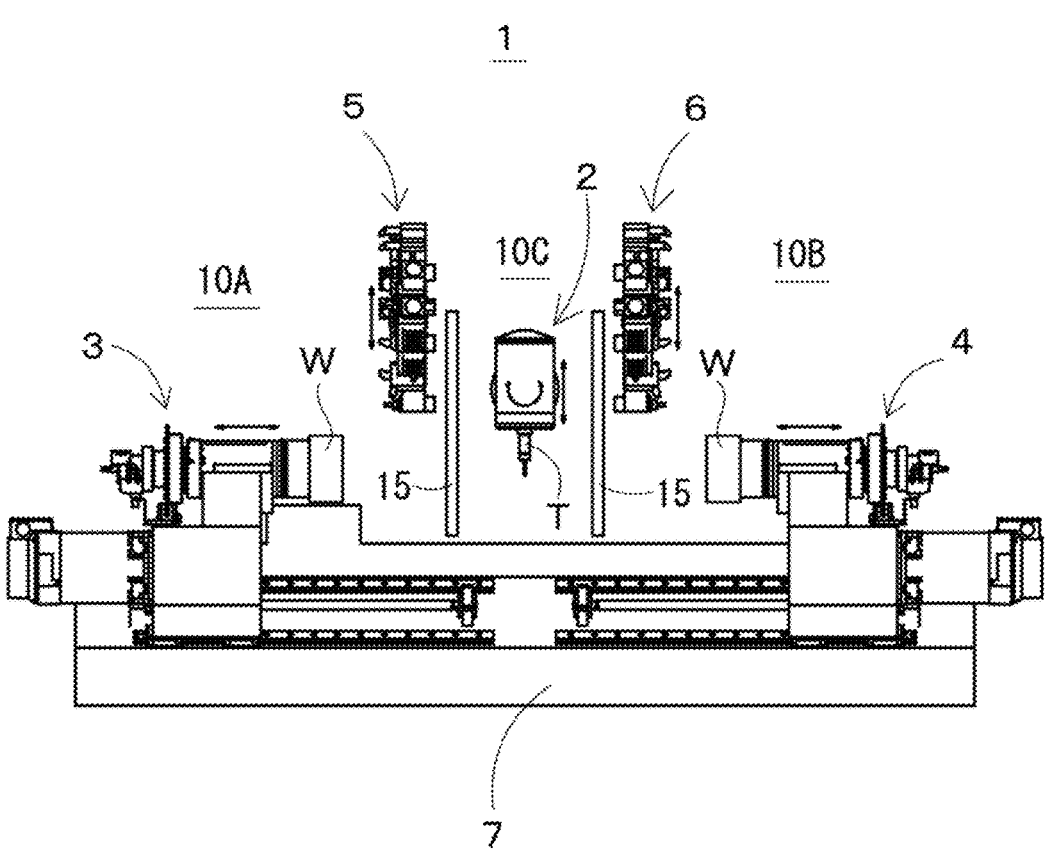
FIG. 8 is a simplified front view of the combined processing machine illustrating a predetermined work step and an opening and closing of the separation shutter.

FIG. 4 is an appearance perspective view of entire combined processing machine 1. In combined working machine 1, not only first workpiece main spindle device 3 or the like on bed 7 but also automatic tool exchanger 8 or workpiece automatic conveyance device 9 are covered by machine body cover 100 as illustrated in FIG. 8. Gantry-type workpiece automatic conveyance device 9 is provided so as to project upward from machine body cover 100, and is configured to move gripped workpiece W in three axial directions in an inside of the machine body. Operation panel 110 is provided at a center of a machine body front surface, and left front door 151 and right front door 152 are formed on both left and right sides of operation panel 110. Tool main spindle device 2 is located behind operation panel 110, and a processing chamber is located behind left front door 151 and right front door 152. Automatic tool exchanger 8 is disposed such that tool magazine 55 (refer to FIG. 5) projects ahead of left and right front doors 151 and 152 on the machine body front surface, and is covered by magazine cover 153.

Figure 5:
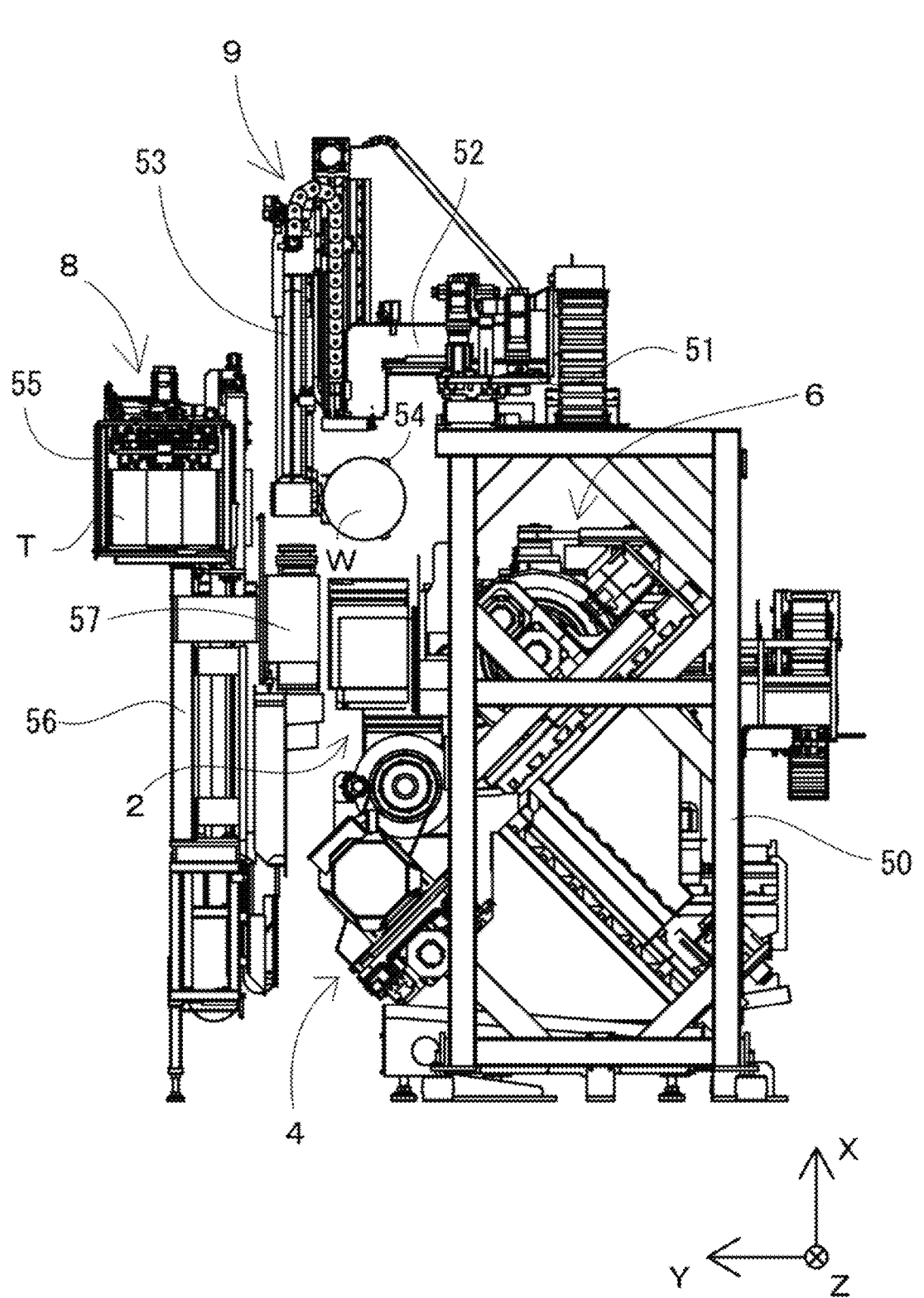
FIG. 5 is a side view illustrating the combined processing machine in a state in which a machine body cover is removed.

FIG. 5 is a side view illustrating combined processing machine 1 in a state in which machine body cover 100 is removed. Combined processing machine 1 is configured with turret-shaped frame structure 50 in which front, rear, left, and right beams are spliced to front, rear, left, and right columns erected in accordance with a width of bed 7. In gantry-type workpiece automatic conveyance device 9, slide base 52 movable in a machine body front-rear direction is mounted on traveling table 51 movable in the machine body width direction on frame structure 50, and lifting and lowering arm 53 having chuck mechanism 54 at a lower end is assembled so as to move up and down, at the tip portion.

In automatic tool exchanger 8 for performing tool exchange, tool magazine 55 housing multiple tools T is mounted on an upper portion of exchanger main body 56, and is supported by two pedestals and a supporting structure having a frame structure connected to bed 7. In automatic tool exchanger 8, tool changer 57 is provided on tool main spindle device 2 side, and a shift device for moving tool T of tool magazine 55 through an inside of exchanger main body 56 to a position of tool changer 57 is configured. Tool changer 57 revolves a tool exchange arm having chucks at both end portions to exchange two tools T.

Incidentally, with combined processing machine 1, it is possible to simultaneously perform processing on workpiece W with first workpiece main spindle device 3 and second workpiece main spindle device 4, and also perform tool exchange in tool main spindle device 2 during the processing. Meanwhile, when these works are performed in one cavity, shavings or chips generated in one processing adhere to other tool T or workpiece W, which may adversely affect each other. For example, in a case where a workpiece is cut with a tool on which the shavings and the like are adhered as it is, processing accuracy is reduced, and a seating error in the chuck mechanism may occur in a state in which the shavings and the like adhere to workpiece W.

On the other hand, in combined processing machine 1, since first workpiece main spindle device 3, second workpiece main spindle device 4, and tool main spindle device 2 perform the works associated with each other, each device cannot be disposed in cavities completely separated from each other. Therefore, in the present embodiment, two separation shutters 15 that can be opened and closed are provided so as to form a cavity corresponding to each work. Separation shutters 15 are disposed on both sides of tool main spindle device 2 in a width direction, and are configured to be horizontally moved in the machine body front-rear direction.

Figure 6:
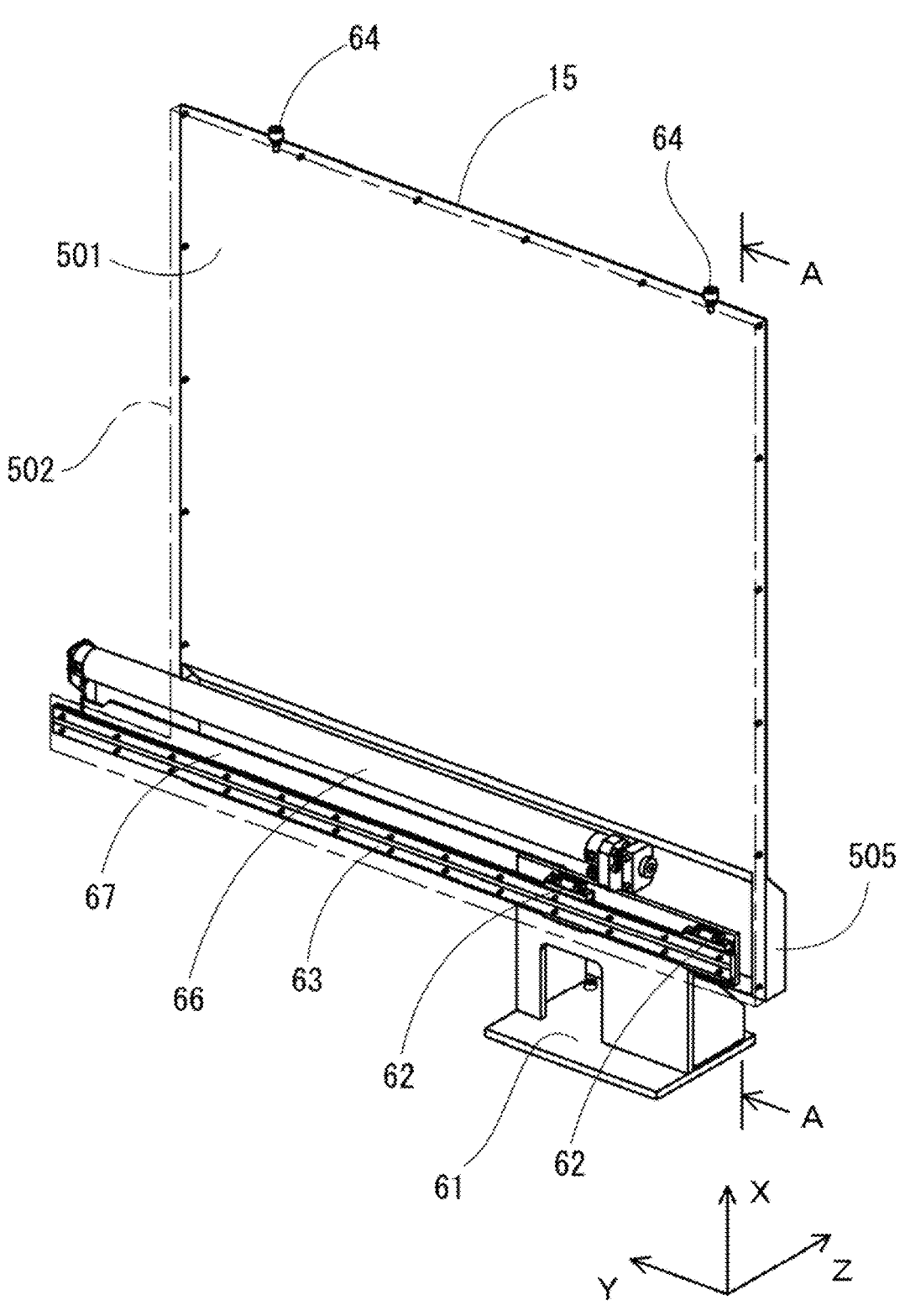
FIG. 6 is a perspective view illustrating a separation shutter.
Figure 7:
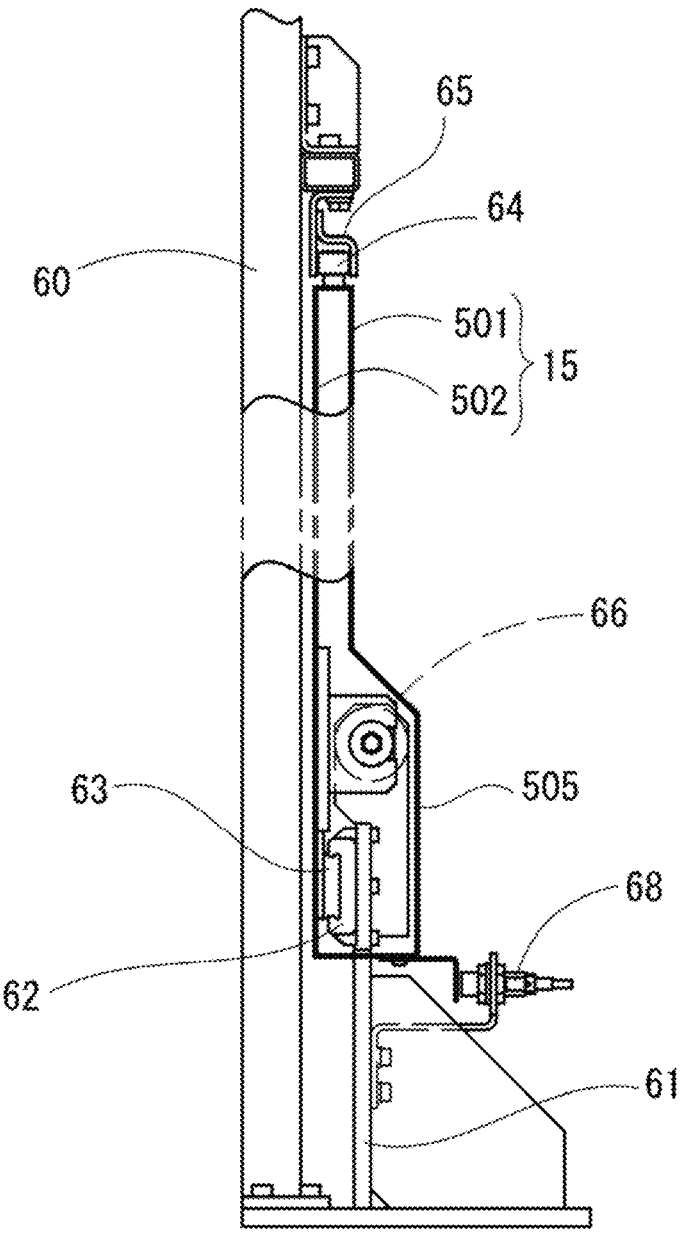
FIG. 7 is a cross-sectional view taken along a line A-A in FIG. 6 illustrating the separation shutter.

FIG. 6 is a perspective view illustrating separation shutter 15, and FIG. 7 is a cross-sectional view illustrating separation shutter 15 taken along a line A-A in FIG. 6. Guide member 62 is fixed to supporting bracket 61 fixed to bed 7 at two locations along the Y-axis, and guide rail 63 fixed to separation shutter 15 side is slidably inserted. In separation shutter 15, box-shaped cover member 502 is stacked on plate-shaped shutter main body 501, and guide roller 64 is attached to upper portion front and rear sides. Shutter frame 60 is fixed to bad 7, guide groove 65 is formed in an upper beam of shutter frame 60, and guide roller 64 is inserted so as to roll inside guide groove 65.

In shutter main body 501, housing portion 505 is three-dimensionally formed at a lower end portion, and a guide portion by guide member 62 and guide rail 63, and air cylinder 66 serving as driving means are housed in housing portion 505. A bottom surface of housing portion 505 of shutter main body 501 is cut off such that supporting bracket 61 passes through housing portion 505. Connection bracket 67 extending in the Y-axis direction is horizontally fixed to supporting bracket 61. Air cylinder 66 is attached such that a head side end portion thereof is fixed to connection bracket 67 and a rod end portion thereof is fixed to supporting bracket 61, respectively, and a piston rod is extended and contracted horizontally in the Y-axis direction. A piston rod tip end is fixed to cover member 502 together with guide rail 53.

Separation shutter 15 is in a closed position in a state illustrated in FIG. 6 in which air cylinder 66 is contracted. Therefore, by an extension operation of air cylinder 66, separation shutter 15 is pushed by the piston rod, guide rail 63 slides on guide member 62 fixed to supporting bracket 61, and guide roller 64 rolls in guide groove 65 at an upper portion and slides along the Y-axis. Proximity switch 68 is provided in accordance with the closed position or an opened position of separation shutter 15, so that the open and close state can be detected.

Figure 9:
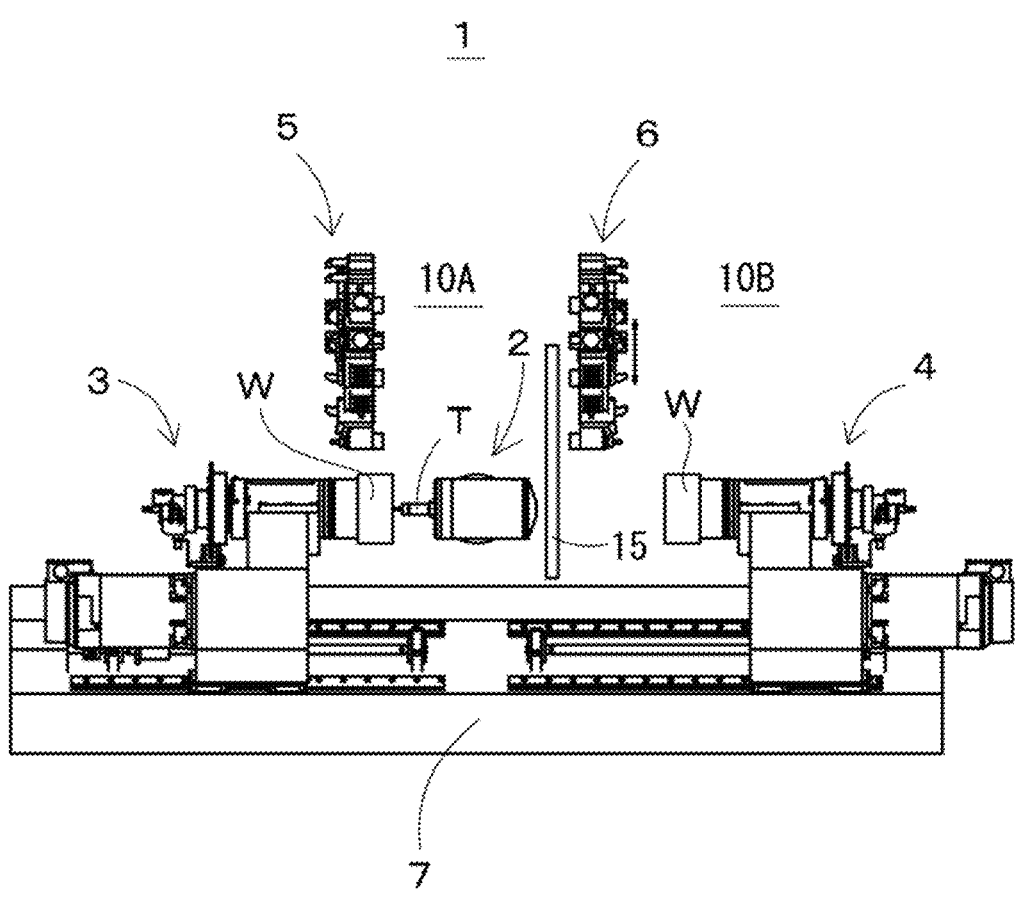
FIG. 9 is a simplified front view of the combined processing machine illustrating a predetermined work step and an opening and closing of the separation shutter.
Figure 10:
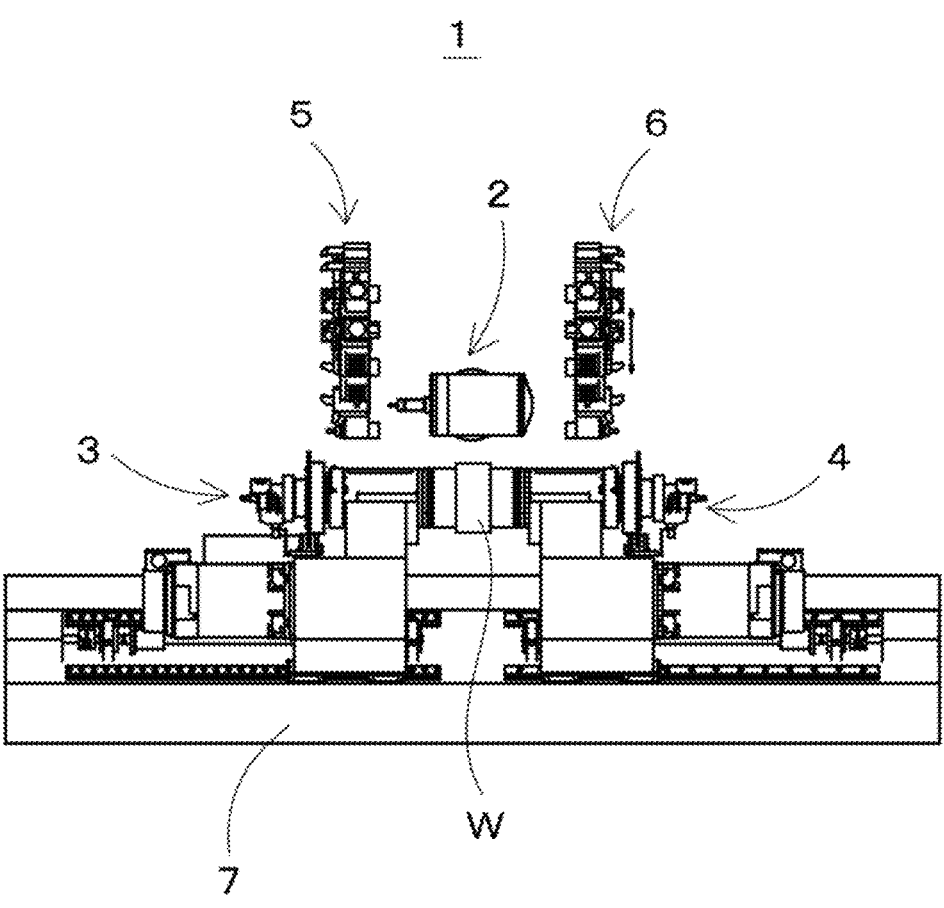
FIG. 10 is a simplified front view of the combined processing machine illustrating a predetermined work step and an opening and closing of the separation shutter.

Next, the processing on workpiece W in combined processing machine 1 will be described. FIGS. 8 to 10 are simplified front views of combined processing machine 1 illustrating a predetermined work step and an opening and closing of separation shutter 15. Since separation shutter 15 is moved in the Y-axis direction through the drawing, it is illustrated in the drawing only in a close state in which a space in the machine is partitioned. In combined processing machine 1, workpiece W as a processing target is taken out of an input side stocker by workpiece automatic conveyance device 9, is conveyed to first workpiece main spindle device 3, and is gripped by chuck mechanism 21. Workpiece W on which first processing is to be performed by first workpiece main spindle device 3 is conveyed to second workpiece main spindle device 4, and is gripped by chuck mechanism 21.

As illustrated in FIG. 8, with combined processing machine 1, it is possible to grip workpiece W by both workpiece main spindle devices 3 and 4, and to simultaneously process workpiece W by turret devices 5 and 6. At this time, in the machine in which separation shutter 15 is closed, first processing chamber 10A by first workpiece main spindle device 3 and turret device 5, second processing chamber 10B by second workpiece main spindle device 4 and second turret device 6, and tool exchange chamber 10C in which tool main spindle device 2 is located are configured. Therefore, in addition to the processing in first processing chamber 10A and second processing chamber 10B, it is possible to simultaneously perform necessary tool exchange with respect to tool main spindle device 2 in tool exchange chamber 10C.

With turret devices 5 and 6, tool T selected by the driving of turret 31 is moved on processing movement line L1 parallel to the YL-axis, and is positioned at a processing position with respect to workpiece W. In first workpiece main spindle device 3, workpiece W gripped by chuck mechanism 21 is rotated by the driving of spindle motor 23 and main spindle slide 24 is moved in the Z-axis direction along guide rail 25, so that tool T abuts onto workpiece W to perform predetermined working. Tool exchange with respect to tool main spindle device 2 is performed such that tool T taken out from tool magazine 55 housing multiple tools T passes through an inside of exchanger main body 56 by the shift device, and is moved to a position of tool changer 57.

In the first processing on workpiece Win first workpiece main spindle device 3, in addition to the processing by first turret device 5, the processing with addition of tool main spindle device 2 or the processing by tool main spindle device 2 alone is performed. In a case where workpiece W is processed by tool main spindle device 2, turret 31 is separated from first workpiece main spindle device 3, and as illustrated in FIG. 9, corresponding one separation shutter 15 slides in a machine body rear direction to open, so that first processing chamber 10A in the machine extends to a range including tool exchange chamber 10C. Therefore, tool main spindle device 2 moves main spindle head 41 by the movements in the Y-axis direction and the X-axis direction, an angle of tool T is adjusted by the rotation of the B-axis, and processing is performed on workpiece W. In the same manner, a side of second processing chamber 10B extends to a range including tool exchange chamber 10C by the opening of other corresponding separation shutter 15, so that processing by tool main spindle device 2 is performed.

Workpiece W on which the second processing is completed is taken out from second workpiece main spindle device 4 by workpiece automatic conveyance device 9, and is collected in an output side stocker. Workpiece W on which the first processing is done is transferred from first workpiece main spindle device 3 to second workpiece main spindle device 4 as illustrated in FIG. 10. In this case, two separation shutters 15 are opened, so that first workpiece main spindle device 3 and second workpiece main spindle device 4 approach the machine body center. First workpiece main spindle device 3 is stopped first, whereas second workpiece main spindle device 4 picks up workpiece W, so that workpiece W is gripped and exchanged by chuck mechanisms 21. On the other hand, in a case where timings of the processing completion in each device do not coincide with each other, workpiece W is taken out from first workpiece main spindle device 3 by workpiece automatic conveyance device 9, and is transported after second workpiece main spindle device 4 completes the processing.

Therefore, with the present embodiment, since combined processing machine 1 is provided such that separation shutter 15 is further provided in the opposed biaxial lathe including first and second turret devices 5 and 6 with respect to the first and second workpiece main spindle devices 3 and 4, with tool main spindle device 2, by partitioning the machine, work can be performed in each cavity without being affected by workpiece processing or the like performed in other processing chamber. Specifically, first processing chamber 10A in which processing is performed by turret device 5, second processing chamber 10B in which processing is performed by second turret device 6, and tool exchange chamber 10C in which tool main spindle device 2 is located are provided. In addition, by opening one separation shutter 15, first processing chamber 10A can be expanded to a range including up to tool exchange chamber 10C of tool main spindle device 2, and by switching the opening and closing with other separation shutter 15, a range of second processing chamber 10B can be expanded by changing the range.

Although one embodiment of the present disclosure has been described, the present disclosure is not limited to these, and various modifications can be made without departing from the gist thereof. For example, a shape, a slide mechanism, or the like of separation shutter 15 may have another structure.

REFERENCE SIGNS LIST

1 . . . combined processing machine, 2 . . . tool main spindle device, 3 . . . first workpiece main spindle device, 4 . . . second workpiece main spindle device, 5 . . . first turret device, 6 . . . second turret device, 7 . . . bed, 8 . . . automatic tool exchanger, 9 . . . workpiece automatic conveyance device, 10A . . . first processing chamber, 10B . . . second processing chamber, 10C . . . tool exchange chamber, 11 . . . front inclined surface, 15 . . . separation shutter

The invention claimed is:

1. A combined processing machine comprising:
a first workpiece main spindle device and a second workpiece main spindle device including each including a main spindle stand configured to rotatably hold a main spindle about an axis;
a first turret device and a second turret device including a turret configured to attach multiple turret tools disposed respectively above the first workpiece main spindle device and the second workpiece main spindle device;

a tool main spindle device disposed between the first turret device and the second turret device, the tool main spindle device including a main spindle head configured to exchangeably and rotatably hold a main spindle head tool; and
two separation shutters configured to partition between the first turret device and the second turret device, on both sides of the tool main spindle device in a width direction,
wherein the two separation shutters form a first processing chamber of the first workpiece main spindle device and the first turret device, a second processing chamber of the second workpiece main spindle device and the second turret device, and a tool exchange chamber of the tool main spindle device in the combined processing machine.

2. The combined processing machine according to claim 1, further comprising:
a bed on which the first workpiece main spindle device and the second workpiece main spindle device are mounted, and
air cylinders respectfully provided to the two separation shutters, wherein
each of the two separation shutters include a main body which is connected to a guide rail,
the guide rail is slidably inserted into a guide member fixed to the bed, and
operation of one of the air cylinders moves a respective one of the two separation shutters via the guide rail between an open state and a closed state.

3. A combined processing machine comprising:
a first workpiece main spindle device and a second workpiece main spindle device including each including a main spindle stand configured to rotatably hold a main spindle about an axis;
a first turret device and a second turret device including a turret configured to attach multiple turret tools disposed respectively above the first workpiece main spindle device and the second workpiece main spindle device;
a tool main spindle device disposed between the first turret device and the second turret device, the tool main spindle device including a main spindle head configured to exchangeably and rotatably hold a main spindle head tool; and
two separation shutters configured to partition between the first turret device and the second turret device, on both sides of the tool main spindle device in a width direction,
wherein the two separation shutters change a size or a range of a processing chamber in the machine by opening and closing each of the two separation shutters.

4. The combined processing machine according to claim 3, further comprising:
a bed on which the first workpiece main spindle device and the second workpiece main spindle device are mounted, and
air cylinders respectfully provided to the two separation shutters, wherein
each of the two separation shutters include a main body which is connected to a guide rail,
the guide rail is slidably inserted into a guide member fixed to the bed, and
operation of one of the air cylinders moves a respective one of the two separation shutters via the guide rail between an open state and a closed state.

* * * * *